United States Patent [19]
Hudspeth

[11] Patent Number: 5,647,140
[45] Date of Patent: Jul. 15, 1997

[54] PRODUCE CENTRIFUGAL SPIN DRYING APPARATUS

[76] Inventor: Emmit Hudspeth, 1185 Commercail Pkwy., Castroville, Calif. 95012

[21] Appl. No.: 606,094

[22] Filed: Feb. 23, 1996

[51] Int. Cl.[6] ............................................ F26B 17/24
[52] U.S. Cl. ................................. 34/58; 34/312; 34/318
[58] Field of Search .......................... 34/312, 313, 318, 34/319, 325, 58

[56] References Cited

U.S. PATENT DOCUMENTS

| | | | |
|---|---|---|---|
| 4,103,432 | 8/1978 | Dieterich et al. | 34/58 |
| 4,189,850 | 2/1980 | Dieterich et al. | 34/58 |
| 4,742,624 | 5/1988 | Grant | 34/58 |
| 5,282,319 | 2/1994 | Casquilho et al. | 34/318 |

*Primary Examiner*—Henry A. Bennett
*Assistant Examiner*—Dinnatia Doster
*Attorney, Agent, or Firm*—Jeffrey A. Hall

[57] ABSTRACT

An apparatus for drying vegetables, fruits, and other produce having a support including a base and at least two upstanding posts. A housing element is secured to the support. A roller conveyor for transferring a container from outside of the housing element to a position within the housing element and for transferring the container from within the housing element to outside of the housing element is secured to the housing element. A hold-down lid for securing and positioning the container within the housing element is secured by a hold-down lid shaft and may be manually or electronically controlled. A plate for supporting and for rotating the container is secured to the plate shafts. The plate is mounted within the housing element and includes a plurality of spaced centrifugal pins being positioned so as to secure the container on the plate. The plate also has a centrifugal pin activation mechanism for activating and positioning the plurality of spaced centrifugal pins as the plate is rotated. A motor for rotating the plate is operably linked to the plate by a drive belt and plate shaft. Entrance and exit doors are mounted on the housing element, each door is operably controlled by an actuator mechanism for opening and closing the doors.

13 Claims, 4 Drawing Sheets

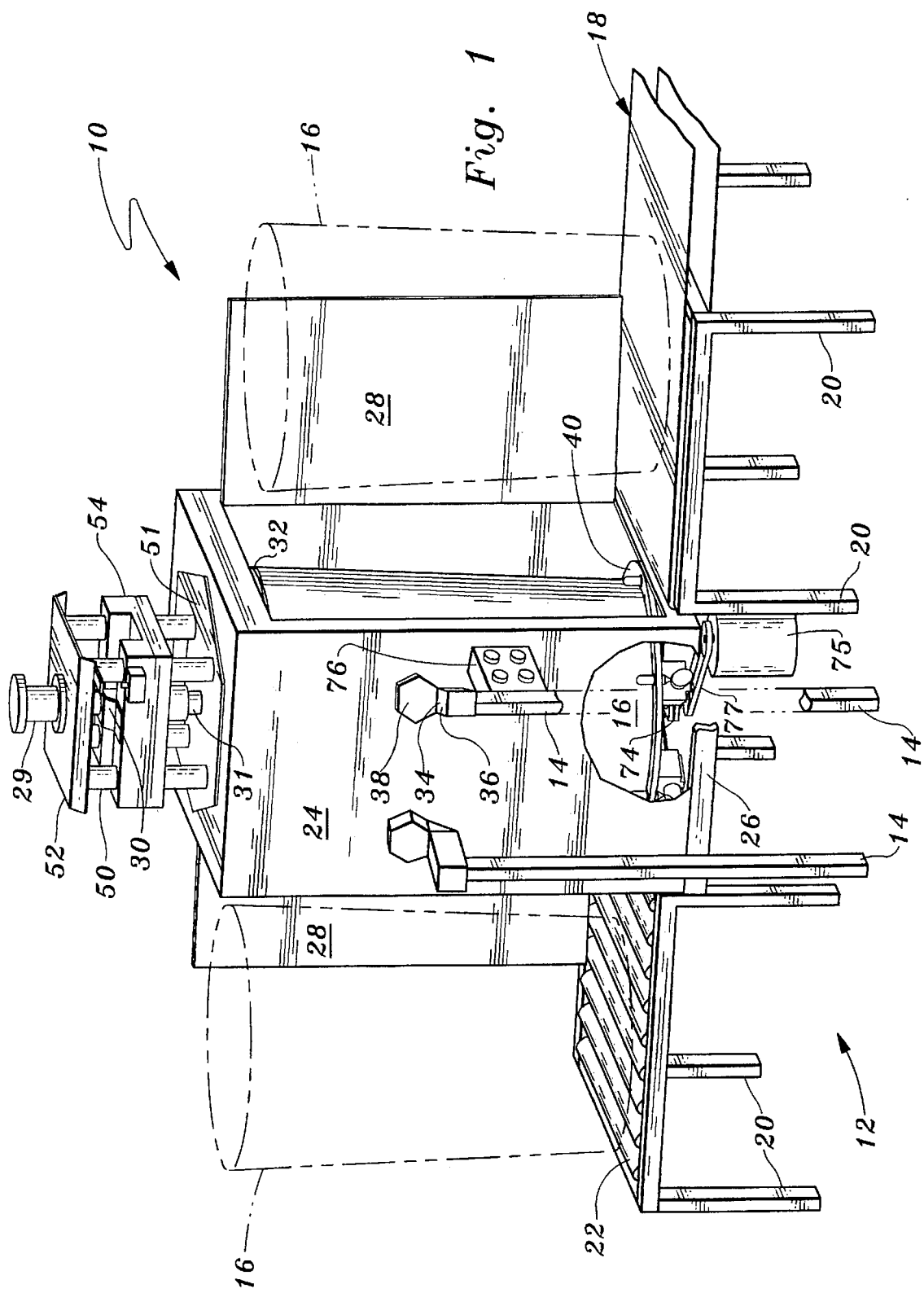

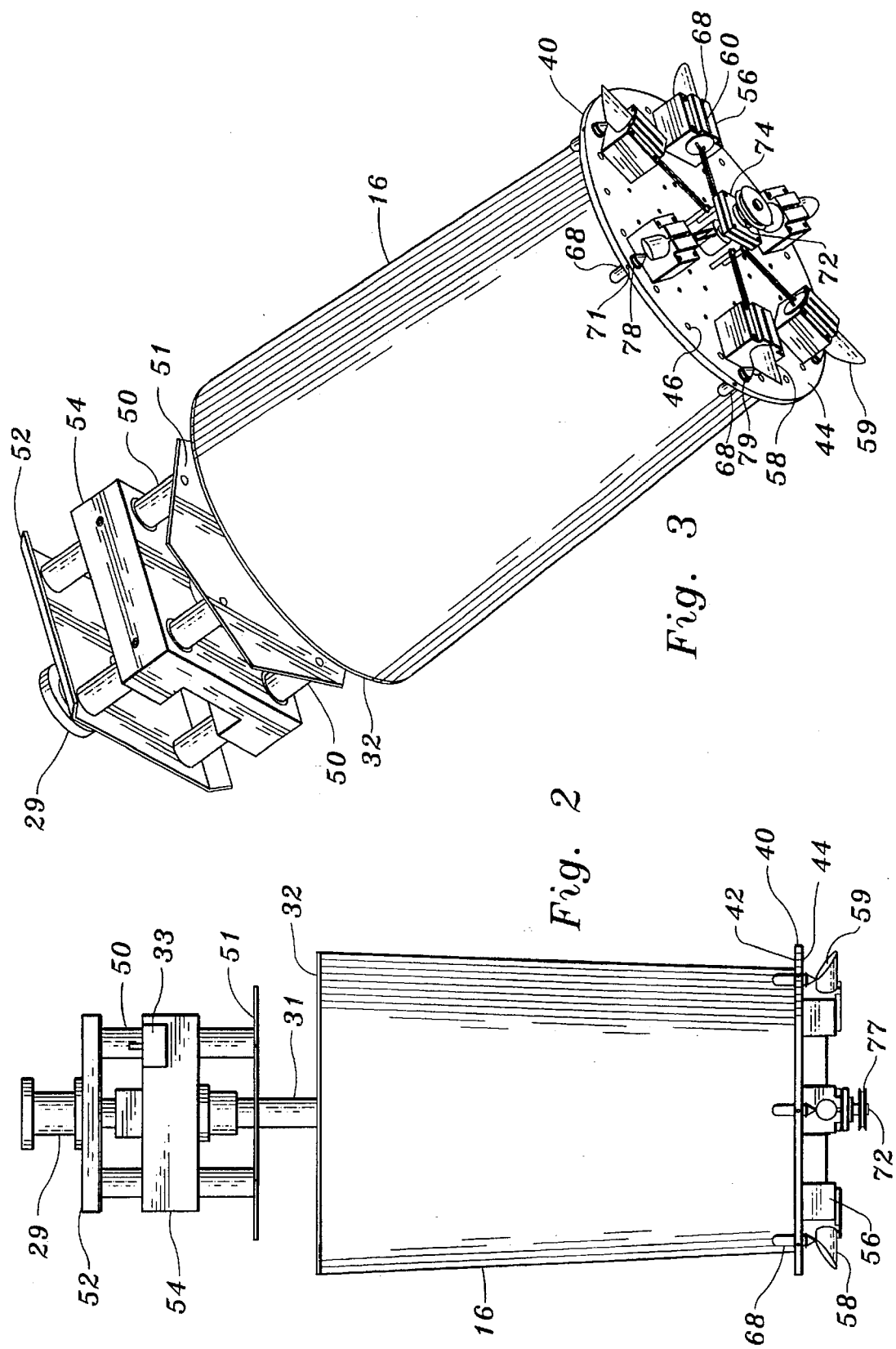

5,647,140

PRODUCE CENTRIFUGAL SPIN DRYING APPARATUS

BACKGROUND OF THE INVENTION

1. Field of Invention

This invention relates to spin drying apparatuses, and more particularly to centrifugal plate spin drying apparatuses for vegetables, fruit, and other produce.

2. Description of the Related Art

Numerous drying apparatuses have been proposed and implemented for drying and treating vegetables, fruits, and other produce. While suitable for many purposes such prior apparatuses have been unsatisfactory because of inefficiencies, reliability problems, and cost. Significant limitations and difficulties have been experienced with such prior drying apparatuses, with particular limitations in efficiencies, use, and maintenance expenses. In particular, significant problems with prior apparatuses include the inability to use upright barrels for holding the vegetable, fruit or other produce, unwanted collection of water within the vegetable and produce holding containers, inefficiencies in water removal, and unwanted clogging and blockage of the spin systems by vegetable and other organic matter. Such limitations have undoubtedly been a reason these prior drying apparatuses have not received widespread acceptance.

Accordingly, it is the primary object of this invention to provide a centrifugal plate spin drying apparatus which is very efficient, portable, easy to install and remove, which can accommodate a wide variety of vegetables and produce, which may be used with upright barrels as the container for the vegetables, fruit and other produce, and which is inexpensive to manufacture, making it ideal for both large scale and smaller scale vegetable, fruit, and other produce drying operations.

Additional objects and advantages of the invention will be set forth in the description which follows, and in part will be obvious from the description, or may be learned by practice of the invention. The objects and advantages of the invention may be realized and obtained by means of the instrumentality's and combinations particularly pointed out in the appended claims.

SUMMARY OF THE INVENTION

To achieve the foregoing objects, and in accordance with the purposes of the invention as embodied mad broadly described herein, a centrifugal plate spin drying apparatus, for drying vegetables, fruits, and other produce is provided, including a housing element secured to a support means. A conveyor for transferring a container from outside of the housing element to a position within the housing element and for transferring the container from within the housing element to outside of the housing element is secured to the housing element is operably secured to the housing. A hold-down lid for securing and positioning the container within the housing element is secured by hold-down lid shafts and may be manually or electronically controlled. A plate for supporting and for rotating the container is secured to plate shahs. The plate is mounted within the housing element and includes a plurality of spaced centrifugal pins being positioned so as to secure the container on the plate. The plate also has a centrifugal pin activation mechanism for activating and positioning the plurality of spaced centrifugal pins as the plate is rotated. A motor for rotating the plate is operably linked to the plate by a drive belt and plate shaft. Entrance and exit doors are mounted on the housing element, each door is operably controlled by an actuator mechanism for opening and closing the doors.

Means for rotating the plate preferably comprise a motor having belt drive means. Means for controlling the closure of said pair of doors mounted on the housing element may be manually or electronically operated and controlled.

Plate means for rotating the container, which may be an upright barrel, basket, bucket or other container, preferably include a plurality of spaced apertures having corresponding pin means for engaging and securing the container on the plate. A centrifugal pin activation means is provided for activating and positioning the plurality of spaced centrifugal pins and preferably includes a plurality of spaced centrifugal blocks positioned on the bottom surface of the plate. Each centrifugal block preferably has a centrifugal force pin slideably positioned therein and each of the centrifugal force pins being in operable engagement with a centrifugal pin.

In accordance with the present invention them also is provided a spin drying apparatus, for drying vegetables, fruits, and other produce, comprising: a support including a base and at least two upstanding posts. A housing element operably secured to the support. Entrance and exit doors are mounted on the housing element, each doors each being operably controlled by actuator means for opening and closing the doors. Transfer means for transferring a barrel from outside of the housing element to a position within the housing element and for transferring the barrel from within the housing element to outside of the housing element is provided. A hold-down lid for securing and positioning the barrel within the housing element is secured to the housing element. Centrifugal plate means for rotating the barrel, the plate means preferably being operably mounted within the housing element. The plate means preferably include a plurality of spaced centrifugal pins being operably positioned so as to secure the barrel on the plate means. The plate means also including centrifugal pin activation means for activating and positioning the plurality of spaced centrifugal pins. A motor for rotating the plate means is preferably operably linked to the plate means by a drive belt and a plate shaft.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

FIG. 1 is a front perspective view of a centrifugal spin drying apparatus, according to the invention.

FIG. 2 is a front view of the centrifugal plate and hold down lid separated from the housing with a barrel positioned therein, according to the invention.

FIG. 3 is a bottom perspective view showing the centrifugal plate, centrifugal blocks and hold down lid shown separated from the housing, according to the invention.

DESCRIPTION OF THE PREFERRED EMBODIMENTS

Figure 4:
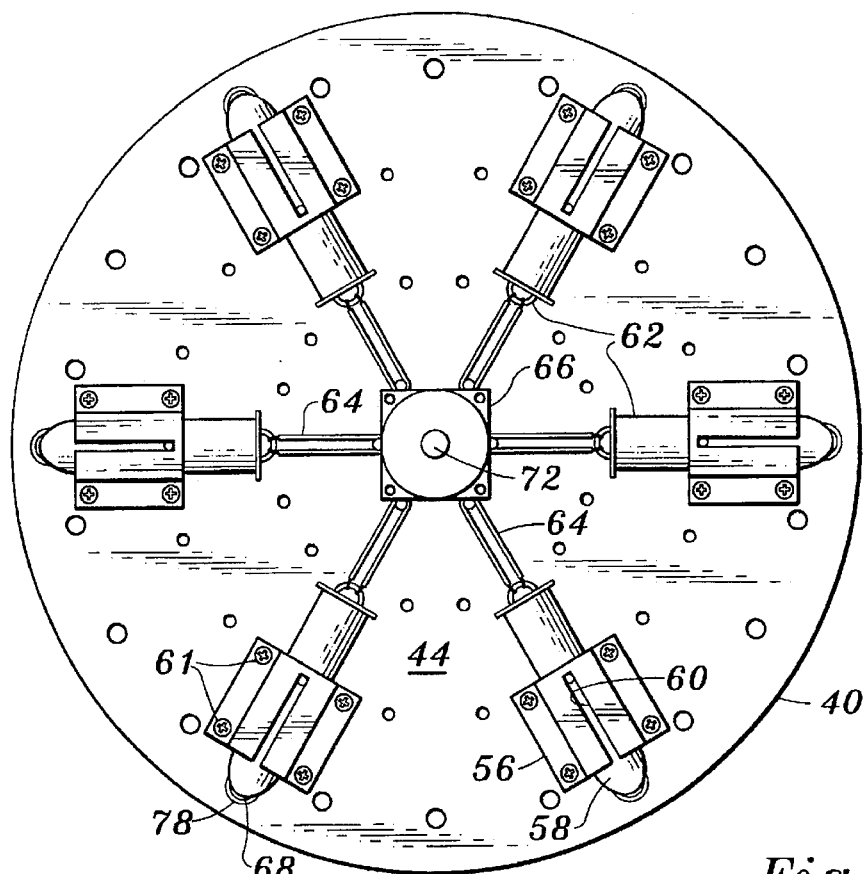
FIG. 4 is a shows a bottom view of the centrifugal plate and centrifugal blocks with centrifugal force pins, according to the invention.
Figure 5:
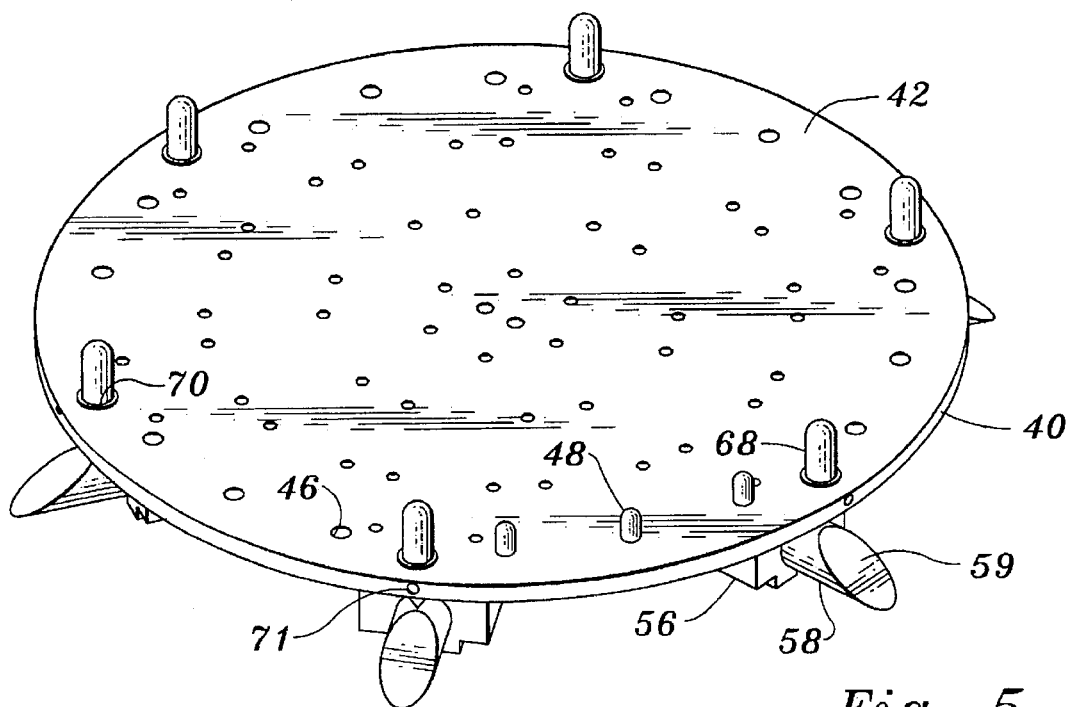
FIG. 5 is a top view of the centrifugal plate showing centrifugal pins raised, according to the invention.

Reference will now be made in detail to the present preferred embodiments of the invention as illustrated in the accompanying drawings.

In accordance with the present invention, there is provided a centrifugal plate spin drying apparatus, for drying vegetables, fruits, and other produce and products having a housing element secured to a support means. A conveyor for transferring a container from outside of the housing element to a position within the housing element and for transferring the container from within the housing element to outside of the housing element is secured to the housing element. A hold-down lid for securing and positioning the container within the housing element is secured a hold-down lid shaft and may be manually or electronically controlled. A plate for supporting and for rotating the container is secured to a plate shaft. The plate is mounted within the housing element and includes a plurality of spaced centrifugal pins being positioned so as to secure the container on the plate. The plate also has a centrifugal pin activation mechanism for activating and positioning the plurality of spaced centrifugal pins as the plate is rotated. A motor for rotating the plate is operably linked to the plate by a drive belt and plate shaft. Doors means which may comprise a pair or two pair of doors are mounted on the housing element, each pair of doors is operably controlled by an actuator mechanism for opening and closing the doors.

In accordance with the present invention, there is also provided a spin drying apparatus for drying vegetables, fruits, and other produce having a support including a base and at least two upstanding posts. A housing element is operably secured to the support. Preferably a set of doors which may each comprise a pair of doors or two pair of doors are mounted on the housing element, the pair of doors each being operably controlled by actuator means for opening and closing the doors. Transfer means for transferring a barrel from outside of the housing element to a position within the housing element and for transferring the barrel from within the housing element to outside of the housing element is provided. An adjustable hold-down lid for securing and positioning the barrel is mounted within the housing element. Centrifugal plate means for rotating the barrel are operably mounted within the housing element. The plate means preferably include a plurality of spaced centrifugal pins being operably positioned so as to secure the barrel on the plate means. The plate means include centrifugal pin activation means for activating and positioning the plurality of spaced centrifugal pins. A motor for rotating the plate means is preferably operably linked to the plate means by at least one chive belt and a plate shaft.

In FIG. 1, the centrifugal spin drying apparatus 10 is shown according to a preferred embodiment of the invention. The spin drying apparatus 10 preferably includes a support including a base 12 with at least two upstanding posts 14, however, three posts, or a plurality of posts may be satisfactorily used. In a typical operation, vegetables, fruits, or other produce are placed in a container, such as barrel 16 and conveyed by a conveyor belt, such as conveyor belt 18 with supports 20, or alternatively, a roller conveyer may be used. The conveyor and operation of spin drying apparatus 10 may be manually or electronically controlled or in alternative embodiments it may be computer controlled. Barrel 16 is preferably fed into spin dryer 10 in an upright orientation as shown in FIG. 1, however, in other applications different shaped containers and different shaped barrels may be used and the various drying orientations may be accommodated with modifications of spin dryer 10 as disclosed.

As seen in FIG. 1, a housing element 24 is secured to upright supports 14 by bolts, screws, welds or other mechanical fastening means. Housing element 14 may be configured in any geometrical configuration, however, a rectangular or angular shaped housing being preferred. Housing element 24 may be provided with forklift support 26 and has doors 28 of both sides thereof for allowing a barrel 16 or other container to be brought inside of housing element 24 and then exited out the other side when drying operations are complete. The opening and closing of doors 28 am preferably controlled by actuator means preferably comprising ram actuator 30, a ram support plate 52, a top block 36, a case reinforcement plate 51, and a shaft 31 which is also operably secured to hold down lid 32 by welds, bolts, screws or the like. A top block 29 secured to run support plate 52 by bolts, screws or the like is provided and best seen in FIGS. 1, 2 and 3. Upon entrance to centrifugal spin drying apparatus 10, hold-down lid 32 is preferably hand actuated to an up position. As lid 32 is moved upwards a limit switch 33 or other switch means well known in the art is used to actuate ram actuator 30 to open doors 28 on both sides of housing element 24. Barrel 16 is then pushed into centrifugal spin drying apparatus 10 either by hand or via mechanical or electronic means well known in the art, such as conveyors, transfer blocks, and then actuator 30 depressed to lower hold down lid 32 to press down on barrel 16. At the time that actuator 30 is depressed the limit on top block 54 releases the limit switch 33 which in turn closes both doors 28. Preferably the limit switch for activating doors 28 is positioned on or near the top of block 54. A knob or button may be provided on top plate 54 which presses the limit which opens doors 28. When a start button on control panel 76 is activated this causes top plate 54 to move in a downward direction which then releases the limit and then doors 28 close. Barrel 16 is now centered and positioned as shown in FIG. 1 and held, secured, and positioned by hold-down lid 32.

As seen in FIG. 1, upright supports 14 may provided with angular isolators which may be secured by bolts 36, screws, welds or other mechanical fastening means to upright supports 14. Side dryer plates 38, which may be configured in any geometric shaped but are shown in FIG. 1 in a preferred hexagon shaped configurations are mounted to housing element 24 by weld, screws, bolts or the like.

Referring now to FIGS. 2 and 3 barrel 16 is shown positioned on plate means, preferably plate 40 secured to shaft 72 having support plate 72 affixed thereto. Plate 40 is preferably composed of a durable resilient material such as metal, alloys, composites or the like, and configured having a substantially planar top surface 42 and a substantially planar bottom surface 44. Plate 40 is provided with a plurality of spaced apertures 46 for holding and securing movable pins 48 which may alternatively be rounded bolts, screws or the like. Apertures 46 are preferably provided in different sizes and spaced for optimum efficiency, for example, apertures 46 may be provided to ⅜ inch pins or bolts, ½ inch pins or bolts, ⁷⁄₁₆ inch pins and bolts or the like and may be offset from surface 42 in similar fashion. Likewise, pins or bolts 48 may be provided in different sizes such as ⅜ inch by 1½ inch, ⅜ inch by 1 and ¼ inch. ½ inch by 1 inch, and the like, and fitted with shallow jam nuts or counter sunk allen heads.

Figure 6:
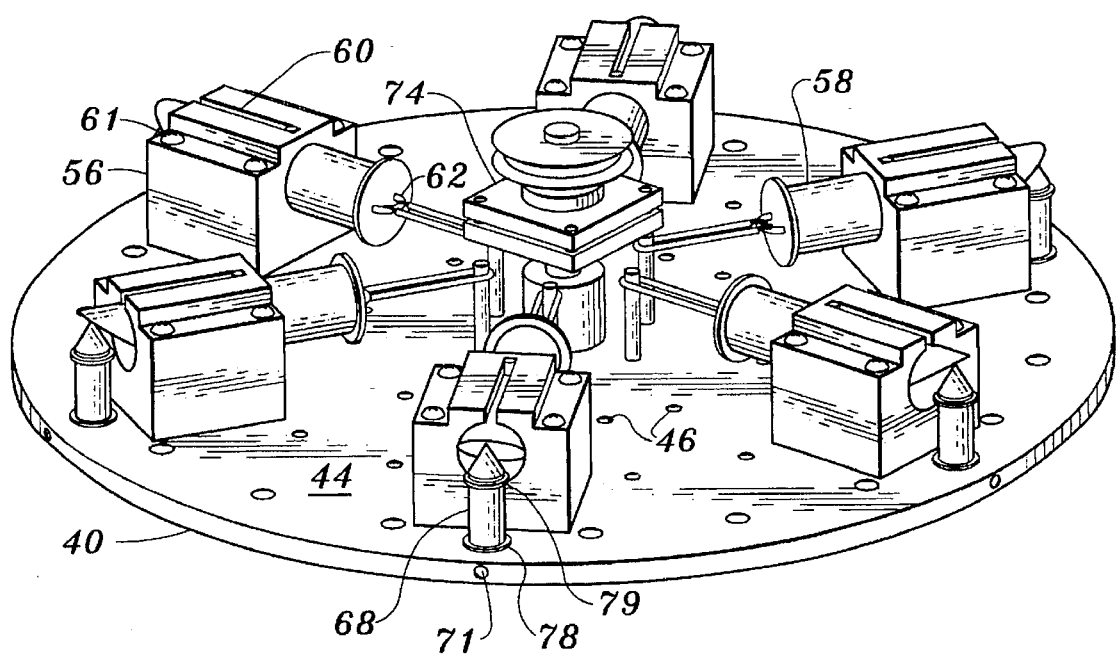
FIG. 6 is a perspective view of the centrifugal blocks and centrifugal force pins of the centrifugal plate, according to the invention.

Referring now to FIGS. 3, 4 and 6 plate 40 is seen with plurality of centrifugal blocks 56 with centrifugal form pins 58 slideably secured therein in slot 60. Centrifugal blocks 56 are preferably secured with bolts 61, or screws, or other fastening means to plate 40. A ring element 62 is preferably secured to an inner end of each centrifugal pin 58 and is preferably secured to a flexible connector 64 such as a bungee cord, rubber strip, extendable cord, or the like, and flexibly secured to plate 40 on support 66 which may be bolted, screwed or welded to plate 40 and is best seen in FIG. 4. Centrifugal form pins 58 are operably linked to centrifugal upright pins 68 with bushing 78 as seen in FIGS. 2, 3, 4, 5 and 6. Centrifugal pins 68 are preferably secured in plate 40 in apertures 70 and with bushing 78 secured with set screw 71 and further secured by snap rings 79 on the pointed end of pin 79, best seen in FIG. 6. When centrifugal force pins are pulled by centrifugal forces inward on plate 40, centrifugal pins 56 slide along their surface and are raised or lowered on plate 40 because of the angular end 59 of the centrifugal form pins, which when centrifugal pin 68 is on the sloped or angular surface 59 thereof are depressed in plate 40. However, when centrifugal form pins 58 am pulled inwards on plate 40 by centrifugal forces, this forms centrifugal pin 68 upwards as it is raised on the surface of centrifugal force pin 58. Accordingly, when barrel 16 is secured in place on plate 40 it is held there by hold down-lid 32 and the centrifugal upright pins 68 and by the depressing of pins 48 on plate 40.

Means for rotating plate 40 are provided by a motor 75 which is operably linked to control panel 76 by conventional means and to shaft 72 by drive linkage 77. Motor 75 may be any motor capable of spinning plate 40 and barrel 16 at a desired velocity, but is preferably powered by 3 ph/220 and input received by 3 ph/220 vac/60 hz.

In operation and use barrels 16 are either manually pushed into housing 24 or powered on roller conveyer belt 18. Hold-down lid 32 is hand actuated to an up position. As hold-down lid 32 moves upward, limit switch 33 actuates ram actuator 30 to open doors 28 on both sides of housing 24. Barrel 16, containing vegetables, fruit, or other produce, is then pushed into centrifugal spin dryer 10, preferably by hand. Ram actuator 30 is then pushed down to lower hold-down lid 32. At the time the actuator is depressed, switch 33 is activated and closes both doors 28, centers the barrel, and locks it in place. The motor is then activated by pressing a start button on control panel 76 operably linked to motor 75. Preferably the motor is powered by 3 ph/220 and in put received by a 3 ph/220 VAC/60 Hz breaker. Preferably, the button that activates ram 30 to push the hold down lid 32 down is configured and connected so as to start motor 75 after a series of predetermined delays. Once engaged on plate 40 barrel 16 preferably centers every 20 hz for stabilization. Preferably at 10 Hz the centrifugal pins are activated, which occurs prior to stabilization of barrel 16. The perfected setting for barrel stabilization am that the next stabilization is set at 40 Hz and will not occur again unless the maximum revolutions per minute (R.P.M.) is set at 60 Hz. Once maximum R.P.M. is established centrifugal spin dryer 10 will hold that setting for the remainder of the timing relay setting. If longer or shorter hold settings are desired, the setting for length of spin can be adjusted without compromising maximum R.P.M. Under such circumstance, preferable a timing relay for desired length of hold spin cycle may simple be adjusted. Once the cycle is complete centrifugal spin dryer 10 will stop automatically. At any time during the spin cycle the centrifugal spin dryer 10 may be stopped by stop button means operably secured to control panel 76. When the drying cycle is completed, the time necessary for dying varying, of course, depending upon the fruit, vegetable, or other product being dried, the centrifugal spin dryer 10 comes to a complete stop. Hold-down lid 32 is released, doors 28 opened, and barrel 16 is removed, preferably by hand from centrifugal spin dryer 10. Once barrel 16 is removed from the dryer, it may be transferred to conveyer 18 and may then be transported away from the dryer. Centrifugal spin dryer 10 is now ready for another barrel of product to be dried and another barrel 16 may be rolled or otherwise moved inside the dryer and the cycle begun again.

As is evident from the above description, a wide variety of spin drying apparatuses based on separating water by centrifugal force from vegetables, fruits, and other produce may be derived from the components of centrifugal spin drying apparatus 10. For example, various sizes, heights, attachments, and materials may be used depending on the application, and additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. A centrifugal spin drying apparatus, for drying vegetables, fruits, and other produce, comprising:

a support including a base and at least two upstanding posts;

a housing element with entrance and exit doors is operably secured to said support; said doors being operably controlled by actuator means for opening and closing said doors; transfer means for transferring a container from outside of said housing element to a position within the housing element and for transferring said container from within the housing element to outside of the housing element;

hold-down means for securing and positioning said container within the housing element;

plate means for rotating said container, said plate means being operably mounted within the housing element, said plate means including a plurality of spaced centrifugal pins being operably positioned so as to secure the container on said plate means; said plate means including centrifugal pin activation means for activating and positioning said plurality of spaced centrifugal pins; and means for rotating the plate means, said means of rotating said plate means being operably linked to the plate means by a plate shaft drive linkage.

2. The centrifugal spin drying apparatus of claim 1, wherein said means for transferring a container from outside of said housing to a position within said housing and for transferring said container from within the housing element to outside of the housing element comprise a conveyer belt.

3. The centrifugal spin drying apparatus of claim 1, wherein said container is a barrel.

4. The centrifugal spin drying apparatus of claim 1, wherein said hold-down means for securing and positioning said container within said housing dement comprises a hold-down lid operably linked to a hold down lid activator means for positioning and engaging said hold-down lid to said container.

5. The centrifugal spin drying apparatus of claim 1, wherein said plate means for rotating said container comprises a plate including a plurality of spaced apertures having corresponding pin means for engaging and securing said container on said plate means.

6. The centrifugal spin drying apparatus of claim 1, wherein said centrifugal pin activation means for activating and positioning said plurality of spaced centrifugal pins include a plurality of spaced centrifugal blocks each having a centrifugal force pin slideably positioned therein and each of said centrifugal form pins being in operable engagement with a centrifugal pin.

7. The centrifugal spin drying apparatus of claim 1, wherein said means for rotating said plate means comprises a motor having a belt drive system operably linked to said plate shaft engaged with said plate means.

8. A spin drying apparatus, for drying vegetables, fruits, and other produce, comprising:

- a support including a base and at least two upstanding posts;
- a housing element operably secured to said support;
- a pair of doors mounted on the housing element, said pair of doors each being operably controlled by actuator means for opening and closing said doors;
- transfer means for transferring a barrel from outside of said housing element to a position within the housing element and for transferring said barrel from within the housing element to outside of the housing element;
- a hold-down lid for securing and positioning said barrel within the housing element;
- plate means for rotating said barrel, said plate means being operably mounted within the housing element, said plate means including a plurality of spaced centrifugal pins being operably positioned so as to secure the barrel on said plate means; said plate means including centrifugal pin activation means for activating and positioning said plurality of spaced centrifugal pins; and
- a motor for rotating the plate means, said motor being operably linked to the plate means by a drive belt and a plate shaft.

9. The spin drying apparatus of claim 8, wherein said means for transferring a barrel from outside of said housing to a position within said housing and for transferring said barrel from within the housing element to outside of the housing element comprise a conveyer belt.

10. The centrifugal spin drying apparatus of claim 8, wherein said barrel is a barrel positioned in an upright orientation.

11. The spin drying apparatus of claim 8, wherein said hold-down lid for securing and positioning said barrel within said housing element comprises a hold-down lid operably linked to a hold-down lid shaft for positioning and engaging said hold-down lid to said barrel.

12. The spin drying apparatus of claim 8, wherein said plate means for rotating said barrel comprises a plate including a plurality of spaced apertures having corresponding pin means for engaging and securing said barrel on said plate means.

13. The spin drying apparatus of claim 8, wherein said centrifugal pin activation means for activating and positioning said plurality of spaced centrifugal pins include a plurality of spaced centrifugal blocks each having a centrifugal force pin slideably positioned therein and each of said centrifugal force pins being in operable engagement with a centrifugal pin.

* * * * *